United States Patent
Christophe et al.

(10) Patent No.: US 7,969,327 B2
(45) Date of Patent: Jun. 28, 2011

(54) DEVICE FOR MANAGING THE WAKING UP PHASE OF AN AIRCRAFT PILOT

(75) Inventors: Laure Christophe, Colomiers (FR); Garance Pin, Cornebarrieu (FR)

(73) Assignee: Airbus France, Toulouse (FR)

( * ) Notice: Subject to any disclaimer, the term of this patent is extended or adjusted under 35 U.S.C. 154(b) by 246 days.

(21) Appl. No.: 12/259,336

(22) Filed: Oct. 28, 2008

(65) Prior Publication Data
US 2009/0109038 A1     Apr. 30, 2009

(30) Foreign Application Priority Data
Oct. 31, 2007    (FR) ..................... 07 58714

(51) Int. Cl.
G08B 23/00 (2006.01)
G08B 21/00 (2006.01)
G08B 13/00 (2006.01)
B60Q 1/00 (2006.01)

(52) U.S. Cl. ............. 340/963; 340/945; 340/573.1; 340/574; 340/575; 340/576; 340/438; 340/439

(58) Field of Classification Search .............. None
See application file for complete search history.

(56) References Cited

U.S. PATENT DOCUMENTS

| | | | | |
|---|---|---|---|---|
| 3,922,665 A * | 11/1975 | Curry et al. | ................... | 180/272 |
| 5,311,877 A * | 5/1994 | Kishi | ............................. | 600/545 |
| 5,682,882 A * | 11/1997 | Lieberman | .................... | 600/301 |
| 7,701,354 B2 * | 4/2010 | Chung | ......................... | 340/573.7 |
| 2003/0011481 A1* | 1/2003 | Bjorkman | ..................... | 340/576 |
| 2004/0070509 A1* | 4/2004 | Grace et al. | ................... | 340/575 |
| 2005/0190065 A1* | 9/2005 | Ronnholm | .................... | 340/575 |
| 2006/0006990 A1* | 1/2006 | Obradovich | .................. | 340/439 |
| 2009/0058624 A1* | 3/2009 | Kane et al. | .................... | 340/439 |
| 2010/0225487 A1* | 9/2010 | Desjardins | ................. | 340/573.1 |

* cited by examiner

*Primary Examiner* — Julie Lieu
(74) *Attorney, Agent, or Firm* — Perman & Green, LLP

(57) ABSTRACT

A device for managing an awakening phase, in flight, of a pilot in the cockpit of an airplane, following a rest period, to guarantee his or her return to a state estimated compatible with flying operations, also called state of vigilance, wherein it includes management means for inducing progressive physical stimuli for generating an awareness by the resting pilot that his or her rest period is over, starting a procedure in the form of actions to be carried out by the pilot, means for displaying the procedure drawn up by the management means. The management device includes a warning device in case a state of hypo-vigilance is detected in the pilot, which is activated when the pilot is assumed to be in a state of vigilance.

7 Claims, 1 Drawing Sheet

NAP END
REMOVE STIFFNESS
DRINK
LOUDSPEAKERS.................................................ON
FUEL...............................................................CHECK
NAV PARAMETERS............................................CHECK
METEO............................................................CHECK
TRAFFIC..........................................................CHECK
SYSTEMS........................................................CHECK
ECAM MEMO....................................................CHECK
AFTER 20S.............................................CREW BRIEFING

☐                                                              CLEAR

DEVICE FOR MANAGING THE WAKING UP PHASE OF AN AIRCRAFT PILOT

BACKGROUND

1. Field

The disclosed embodiments relate to the field of airplane flying. More particularly, the disclosed embodiments relate to a device making it possible to manage the awakening phase of a pilot after a phase of rest so as to allow the pilot to become more rapidly aware of the environmental situation than in the case of a non-assisted awakening.

2. Brief Description of Related Developments

Aboard airplanes, and more particularly aboard civil air transport short, medium or long-haul airplanes, crews are composed of at least two pilots: one captain and one co-pilot. Aboard an airplane, the captain is always responsible for the flight and for the airplane and consequently he or she is the only one authorised to make certain decisions.

Generally, the captain, for fear that the co-pilot might fall asleep or would not wake him/her up, cannot rest even in case of serious fatigue.

During flights, and more particularly during medium or long-haul flights, the captain accumulates an important lack of sleep and the level of his or her fatigue may be very high, in particular because of work schedules which are often shifted with respect to the biological rhythm, and very important work load during landings and take-offs. A state of high fatigue is liable to cause phases of drowsiness and hypo-vigilance, which result in a reduction of performance and unconscious phases of micro-sleep. Micro-sleep phases can be detected in pilots during a flight, using a hypo-vigilance monitoring device, even during a critical phase such as the approach.

The phases of somnolence are attenuated thanks to speech communication or to motor activities in connection with a mental task. On the contrary, they are more frequent with crews only composed of two pilots, generally during the cruising phases which require only a passive surveillance (progressive occurrence of monotony), and/or during the post-prandial period and/or during times favourising a drowsiness, i.e. between 11 h00 p.m. and 1 h00 a.m. and between 1 h00 p.m. and 3 h00 p.m., according to the pilot's biological clock. In addition, such phases of drowsiness sometimes occur simultaneously for both pilots.

At present, modern airplanes are equipped with a "Timer" function, which, through a diverted use, allows the crews to create an alarm which sounds at a preset time.

The rest periods allow the phases of somnolence to be substantially reduced and the pilots' vigilance whatever the phases of flying to be improved, mainly during the phases requiring a particular vigilance such as the take-off and approach phases.

However, resting generates undesirable effects, such as for example sleep inertia, which is a phase of transition between the rest and the awakening. The sleep inertia induces a transitory hypo-vigilance, which means a temporary deterioration of physical and mental performances. In addition, during the rest period, the pilot has lost conscience of the environmental situation and the evolution thereof. Sleep inertia may last between 5 and 20 minutes, but a few simple methods exist for awakening and attenuating it more quickly, such as for example speech communication, motor activities, mental activities, a greater brightness, having a drink.

However, no function assigned to the awakening of a pilot resting in the cockpit, exists at the moment, within the frame of the rules emitted by public authorities and taking into consideration the operating companies' internal procedures.

Thus, there is an interest in proposing an efficient device for managing the period of awakening of the pilot, so as to allow him or her to become more rapidly and efficiently aware of the information relating to the situation of the airplane and of the flight at the end of a rest period.

SUMMARY

The disclosed embodiments consist of a device for managing an awakening phase, in flight, of a pilot in the cockpit of an airplane, following a rest period, to guarantee his or her return to a state considerated as being compatible with flying operations, also called state of vigilance, which consists of:

management means for:

inducing progressive physical stimuli for generating an awareness by the resting pilot that his or her rest period is over, starting a procedure in the form of actions to be carried out by the pilot, means for displaying the procedure drawn up by the management means.

Management means consist of a control device acting on means for generating and emitting sound signals and/or means for generating and emitting visual signals.

Advantageously, the display means consist of a screen in the cockpit of the airplane where the various actions to be carried out and to be acknowledged by the pilot are displayed.

The device for managing an awakening phase receives at least one actuation signal from a device for managing the pilot's rest.

The device for managing an awakening phase further consists of a warning device in case of a state of hypo-vigilance detected in the pilot, which is activated by the management means when the pilot is assumed to be in a state of vigilance.

The warning device generates a control signal for activating at least one hypo-vigilance warning when the pilot is detected as being hypo-vigilant.

In one embodiment, said control signal activates at least one hypo-vigilance warning having a higher level than the preceding active hypo-vigilance warning when the pilot has not carried out an expected action in response to said previous warning, within a preset period.

Advantageously, the warning device uses all or a part of the warning means associated with a monitoring and warning device relating to the parameters of the airplane.

The detailed description of the disclosed embodiments is made while referring to the figures which show:

DETAILED DESCRIPTION OF THE DRAWINGS

Figures 1, 2:
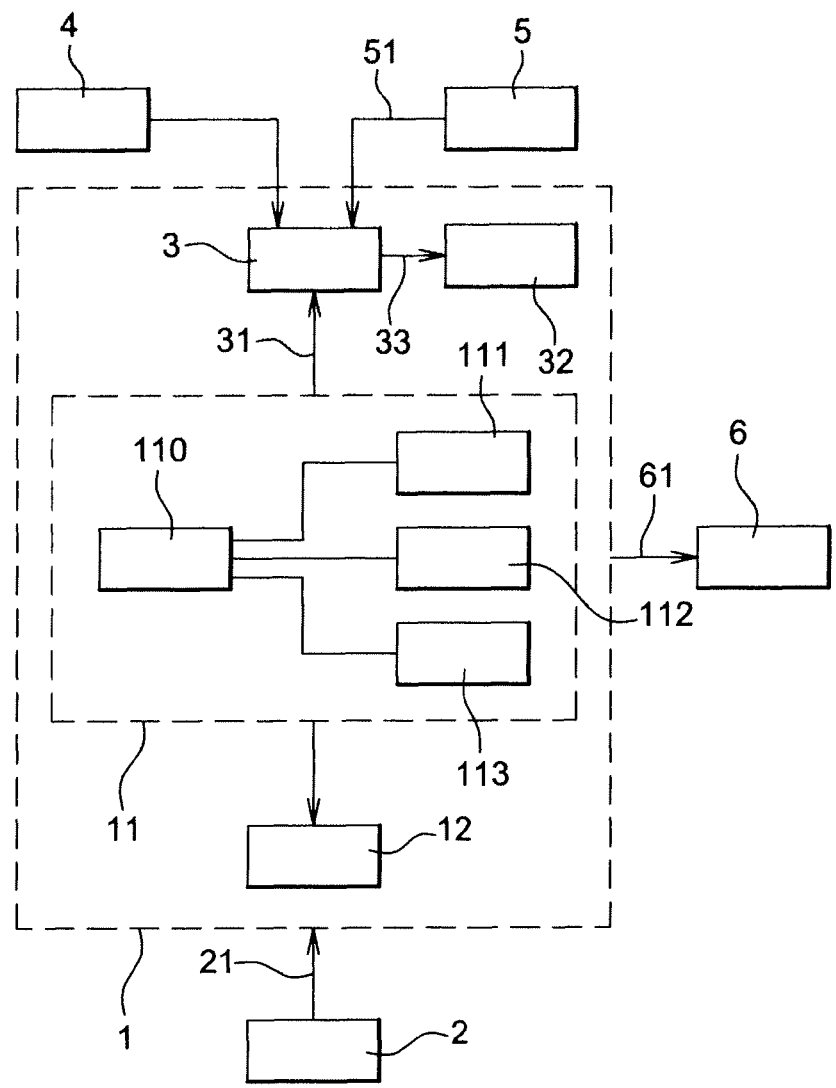
FIG. 1, a diagram of the device for managing an awakening phase according to the disclosed embodiments, FIG. 2, an example of a display screen displaying a list of actions to be carried out and to be acknowledged by the pilot.

A device 1 for managing an awakening phase of a pilot at the end of a rest period in the cockpit of an airplane, during a flight, for example a long-haul flight, according to the disclosed embodiments, consists of, as shown in FIG. 1:

management means 11 for progressively inducing physical stimuli so as to generate an awareness by the pilot having a rest that his or her rest period is over, and guaranteeing his or her return to a state which is estimated as being compatible with flight operations, also called state of vigilance, means 12 for displaying a procedure, to be carried out by the pilot, set up by the management means 11.

At the end of a rest period, the management means 11 make and/or monitor actions, which are explained and detailed hereinunder, and check the pilot's behaviour in response to some of such actions.

The management means 11 are informed that the rest period is over by all means, for example by a signal emitted by means for managing the rest period or by a timer function which can be built into the management means 11 proper.

The management means 11 consist of a control device 110, for example a calculator, which acts on:

means 111 for generating and emitting sound signals, for example gradually emitted by a warning speaker in the cockpit, and/or means 112 for generating and emitting visual signals, to the pilot's attention when his or her rest period is over and/or to another pilot's attention, who is not having a rest but who has been detected as being hypo-vigilant, said visual signals being for example produced by one or several lights and/or on a display screen, a message meaning "rest period over", and/or means for controlling the brightness and the sound 113, more particularly for gradually increasing the brightness and the sound in the cockpit, when the brightness and the sound volume have been attenuated during the pilot's rest period.

The means 111 for generating and emitting sound signals, the means 112 for generating and emitting visual signals and the means for controlling the brightness and the sound 113 are wholly or partly integrated in the management means 11. Preferably, when the means for generating and emitting sound signals 111, visual signals 112, and the means for controlling the brightness and the sound 113 are existing on the airplane, they are connected to the control device 110.

When the management means 11 are informed that a rest period is over, said management means automatically start a procedure that the pilot must carry out so that he or she becomes aware of information relating to the airplane and to the flight and more quickly returns to a state of high vigilance so as to take back the controls of the airplane.

The procedure, of the order of twenty minutes, consists in requesting the pilot to carry out a list of operations, relating to the airplane or to the flight, without any effect on the airplane or the flight. The awareness of the situation of the airplane and of the flight through such a procedure entails no risk in case of an erroneous action or a misinterpretation by the pilot. When this procedure is carried out, i.e. after the acknowledgement by the pilot of checkings carried out for each operation in the list, the pilot may, as mentioned in the rules emitted by the public authorities, exchange information with the other pilot and take back the controls of the airplane.

In one preferred embodiment, the procedure requests the pilot to check indications for example relating to:

the flight parameters, the main systems in the airplane, such as for example, the engines or the flight controls, the amount of remaining fuel, the climatic conditions, . . .

The display means 12 consist of a display screen, for example a screen existing in the cockpit such as a screen of the "ECAM" system which belongs to a centralised monitoring device for the various systems on the airplane, which already exists in the cockpit.

An example shown in FIG. 2 illustrates a display screen consisting of a list of operations to be checked prior to the pilot taking back the controls of the airplane.

When all the checkings are carried out and acknowledged by the pilot, the management means 11 and the display means 12 are disabled either through a pilot's specific action, or through the carrying out of the last expected action.

The device 1 for managing the awakening phase is advantageously connected to a device 2 for managing the pilot's rest, capable of allowing the management of a rest period and the isolation of the pilot in the cockpit in order to improve the quality of his or her rest and his or her capacities for an increased vigilance during the active phases of the flight, such as for example a take-off or approach phase. When the rest period is over, the device 2 for managing the pilot's rest generates an activation control signal 21 of the awakening phase and thus the management means 11.

The device 1 for managing the awakening phase further consists of a warning device 3 in case hypo-vigilance is detected.

The management means 11 generate a control signal 31 for activating the warning device 3 when the pilot is assumed to be in a state of vigilance, i.e. for example, following the acknowledgement by the pilot of all the actions requested by the procedure.

Said warning device is connected to a hypo-vigilance monitoring device 4, which is specific to each pilot, capable of detecting micro-sleep phases in the pilot.

The hypo-vigilance monitoring device 4 is active for the pilot throughout along the flight. Said hypo-vigilance device is deactivated when one pilot is in a rest period and reactivated when the rest period is over, advantageously without any specific action by the pilot, thus without any risk that said pilot might forget to reactivate it.

The warning device 3 generates at least one signal of activation 33 of at least one hypo-vigilance warning 32 in the case where at least one of the pilots has been detected as being hypo-vigilant.

Hypo-vigilance warnings 32 activated by the signal 33 are for example visual warnings, on a warning light or on a display screen, more particularly a warning message, of the "hypo-vigilance detected" type and/or a change in the colour, and/or sound warnings, for example emitted by the speakers in the cockpit.

In one embodiment, several hypo-vigilance warning types are defined level by level, with for example various intensities, and they are successively operated, using among others things an interface, in increasing order, for example according to the increasing intensity, in case of no reaction, within a preset period, by the pilot or the pilots to the previous hypo-vigilance warning. The interface is for example a display screen, such as an "ECAM" screen.

In one exemplary embodiment, four types of hypo-vigilance warnings are successively triggered as follows:

a first alarm, also called alarm A, having the weakest intensity, is triggered when the hypo-vigilance of at least one pilot is detected, a second alarm, also called alarm B, is triggered when alarm A is operated for a preset period of time, for example two minutes, a third alarm, also called alarm C, is triggered when alarm B is operated for a preset period of time, for example one minute, a fourth alarm, also called alarm D, having the highest intensity, is triggered when alarm C is operated for a preset period of time, for example fifteen seconds.

The alarm A only consists of a visual warning, such as for example an amber-coloured warning message, to the attention of the pilot who has been detected as being hypo-vigilant.

Said alarm A is deactivated by an action by the pilot concerned, for example when he or she presses a specific button materialised on the navigation screen or by pressing a warning light, for example the "Master Caution" button.

The alarm B consists of a visual warning and a sound warning, to the attention of the pilot who has been detected as being hypo-vigilant. The visual alarm is, for example, an amber-coloured warning message. The sound warning is, for example, a unique alarm, such as a periodical gong.

Said alarm B is deactivated by an action by the pilot concerned for example by pressing a specific button materialised on the navigation screen or by pressing a warning light, for example the "Master Caution" button.

The alarm C consists of two visual warnings and one sound warning, to the attention of the pilot who has been detected as being hypo-vigilant and to the other pilot. Both visual warnings are for example an amber-coloured warning message, and the "Master Caution" warning light on. The sound warning is, for example, a unique gong type alarm, having a sound intensity higher than alarm A and/or a less nice sound.

Said alarm C is deactivated by an action by one of the two pilots, by pressing the "Master Caution" alarm button.

The alarm D consists of two visual warnings and one sound warning, to the attention of the pilot who has been detected as being hypo-vigilant, of the other pilot and of the cockpit personnel. The two visual warnings are for example a red-coloured warning message, and a "Master Warning" warning light on. The sound warning is, for example, a repeated alarm.

Said alarm D is deactivated by one action by one of the pilots, by pressing the "Master Warning" warning light.

Advantageously, the device uses all or a part of the warning means associated with a monitoring and warning device 5 of the airplane parameters. Said monitoring and warning device generates a control signal 51 for activating the warning device 3, when the airplane safety criteria are not met.

Advantageously, the device 1 for managing the awakening of a pilot is connected, through a connection 61, to a device 6 back feeding information on the pilots, activity in the cockpit to the cabin personnel and positioned in a passenger's cabin.

The device for the back feeding 6 of the pilots' activity consists of an interface including at least one display screen on which information relating to the pilots' activity in the cockpit is displayed. For example, the cabin personnel is informed when one of the pilots is having a rest and may, consequently, adapt their behaviour to the environment in the cockpit, for example by reducing their coming into said cockpit or by being quiet while getting into said cockpit. In another example, the cabin personnel is informed when at least one of the pilots is detected as being hypo-vigilant by the warning device 3 and when none of the pilots responses the warnings.

The device for managing the awakening of a pilot after a phase of rest according to the disclosed embodiments thus enables the pilot whose rest period is over to return more rapidly to his flight activity while complying with the rules concerning the regulations emitted by the public authorities as regards the resumption of activities after a rest period in the cockpit.

The invention claimed is:

1. A device for managing the awakening phase, in flight, of a pilot in the cockpit of an airplane, following a rest period, to guarantee his or her return to a state considered as compatible with flying operations, also called state of vigilance, comprising:
    management means for:
        receiving at least one activation signal from a device for managing the pilot's rest, for managing a rest period of said pilot,
        inducing progressive physical stimuli for generating an awareness by the resting pilot that his or her rest period is over,
        starting a procedure requesting the pilot to carry out a list of successive operations relating to the airplane and to the flight, without any effect on the airplane or the flight,
    means for displaying the list of the operations as mentioned in the procedure.

2. A device according to claim 1, wherein the management means comprises a control device acting on means for generating and emitting sound signals.

3. A device according to claim 1, wherein the management means comprises a control device acting on means for generating and emitting visual signals.

4. A device according to claim 1, wherein the display means comprises a screen in the cockpit of the airplane, on which the various operations to be carried out and to be acknowledged by the pilot are displayed.

5. A device according to claim 1, generating a control signal for activating a warning device when the pilot is assumed to be in a state of vigilance.

6. A device according to claim 5, wherein the warning device generates a control signal for activating at least a hypo-vigilance warning when the pilot is detected as being hypo-vigilant.

7. A device according to claim 6, wherein the control signal activates at least one hypo-vigilance warning with a higher level than a preceding active hypo-vigilance warning when the pilot has not carried out an expected action in response to said previous alarm within a preset period.

* * * * *